US011487450B1

(12) United States Patent
Gunda et al.

(10) Patent No.: US 11,487,450 B1
(45) Date of Patent: Nov. 1, 2022

(54) STORAGE SYSTEM AND METHOD FOR DYNAMIC ALLOCATION OF CONTROL BLOCKS FOR IMPROVING HOST WRITE AND READ

(71) Applicant: Western Digital Technologies, Inc., San Jose, CA (US)

(72) Inventors: Sridhar Prudviraj Gunda, Karnataka (IN); Yarriswamy Chandranna, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 54 days.

(21) Appl. No.: 17/320,836

(22) Filed: May 14, 2021

(51) Int. Cl.
*G06F 3/06* (2006.01)
*G06F 12/1009* (2016.01)

(52) U.S. Cl.
CPC .......... *G06F 3/0631* (2013.01); *G06F 3/0604* (2013.01); *G06F 3/064* (2013.01); *G06F 3/0679* (2013.01); *G06F 12/1009* (2013.01); *G06F 2212/1016* (2013.01)

(58) Field of Classification Search
CPC ...... G06F 3/0631; G06F 3/0604; G06F 3/064; G06F 3/0679; G06F 12/1009; G06F 2212/1016
See application file for complete search history.

(56) References Cited

U.S. PATENT DOCUMENTS

| | | | | |
|---|---|---|---|---|
| 2009/0271562 A1* | 10/2009 | Sinclair | ............... | G06F 12/0246 711/E12.008 |
| 2014/0157078 A1* | 6/2014 | Danilak | ................ | H03M 13/09 714/773 |
| 2014/0181369 A1* | 6/2014 | Horn | .................... | G06F 12/0246 711/103 |
| 2014/0281126 A1* | 9/2014 | Bleyer | ................ | G06F 12/0246 711/103 |
| 2016/0103617 A1* | 4/2016 | Kang | .................... | G06F 3/0608 711/103 |
| 2018/0357159 A1* | 12/2018 | Parker | ...................... | G06F 3/061 |
| 2020/0110545 A1* | 4/2020 | Choi | ........................ | G06F 3/0679 |
| 2021/0157674 A1* | 5/2021 | Muchherla | ............ | G06F 11/076 |

* cited by examiner

*Primary Examiner* — Francisco A Grullon
(74) *Attorney, Agent, or Firm* — Crowell & Moring LLP

(57) ABSTRACT

A storage system has a pool of reserved memory blocks that can be used either as control blocks or as overprovision blocks. A controller in the storage system can dynamically allocate one or more blocks reserved for control blocks as extra overprovision blocks. If the storage system is running low on control blocks, the controller can allocate the extra blocks from overprovision pool back as control blocks.

20 Claims, 10 Drawing Sheets

| Current SLC Over Provision | MTM Control Blocks | MTM Blocks Used For SLC Over Provision | Overall SLC Over Provision | % Improve in SLC Caching |
|---|---|---|---|---|
| 122 | 26 | 0 | 122 | 0.00 |
| 122 | 26 | 1 | 123 | 0.82 |
| 122 | 26 | 2 | 124 | 1.64 |
| 122 | 26 | 3 | 125 | 2.46 |
| 122 | 26 | 4 | 126 | 3.28 |
| 122 | 26 | 5 | 127 | 4.10 |
| 122 | 26 | 6 | 128 | 4.92 |
| 122 | 26 | 7 | 129 | 5.74 |
| 122 | 26 | 8 | 130 | 6.56 |
| 122 | 26 | 9 | 131 | 7.38 |
| 122 | 26 | 10 | 132 | 8.20 |
| 122 | 26 | 11 | 133 | 9.02 |
| 122 | 26 | 12 | 134 | 9.84 |
| 122 | 26 | 13 | 135 | 10.66 |
| 122 | 26 | 14 | 136 | 11.48 |
| 122 | 26 | 15 | 137 | 12.30 |
| 122 | 26 | 16 | 138 | 13.11 |
| 122 | 26 | 17 | 139 | 13.93 |
| 122 | 26 | 18 | 140 | 14.75 |
| 122 | 26 | 19 | 141 | 15.57 |
| 122 | 26 | 20 | 142 | 16.39 |
| 122 | 26 | 21 | 143 | 17.21 |
| 122 | 26 | 22 | 144 | 18.03 |
| 122 | 26 | 23 | 145 | 18.85 |
| 122 | 26 | 24 | 146 | 19.67 |
| 122 | 26 | 25 | 147 | 20.49 |
| 122 | 26 | 26 | 148 | 21.31 |

FIG. 8

STORAGE SYSTEM AND METHOD FOR DYNAMIC ALLOCATION OF CONTROL BLOCKS FOR IMPROVING HOST WRITE AND READ

BACKGROUND

A host can send a write command to a storage system that specifies a logical address to store the data. A controller in the storage system then stores the data in a location in a memory of the storage system and updates a logical-to-physical address table to associate the logical address specified by the host in the write command with a physical address of the location in the memory where the data is stored.

BRIEF DESCRIPTION OF THE DRAWINGS

FIG. 8 is a chart showing performance measurements of an embodiment.

DETAILED DESCRIPTION

The following embodiments are generally related to a storage system and method for dynamic allocation of control blocks for improving host write and read. In one embodiment, a storage system is provided comprising: a memory comprising a first number of blocks configured to be reserved as control blocks and a second number of blocks configured to be reserved as overprovision blocks; and a controller coupled to the memory. The controller is configured to allocate some of the first number of blocks as overprovision blocks instead of control blocks; determine whether a number of control blocks that are free is less than a threshold; and in response to determining that the number of control blocks that are free is less than the threshold, allocate an overprovision block as a control block. In another embodiment, a method is provided that is performed in a storage system comprising a memory comprising a first number of blocks configured to be reserved as control blocks and a second number of blocks configured to be reserved as overprovision blocks. The method comprises: allocating some of the first number of blocks as overprovision blocks instead of control blocks; determining whether a number of control blocks that are free is less than a threshold; and in response to determining that the number of control blocks that are free is less than the threshold, allocating an overprovision block as a control block. In yet another embodiment, a storage system is provided comprising a memory comprising a first number of blocks configured to be reserved as control blocks and a second number of blocks configured to be reserved as overprovision blocks; means for allocating some of the first number of blocks as overprovision blocks instead of control blocks; means for determining whether a number of control blocks that are free is less than a threshold; and means for allocating an overprovision block as a control block in response to determining that the number of control blocks that are free is less than the threshold. Other embodiments are provided, and each of these embodiments can be used alone or in combination.

Figure 1A:
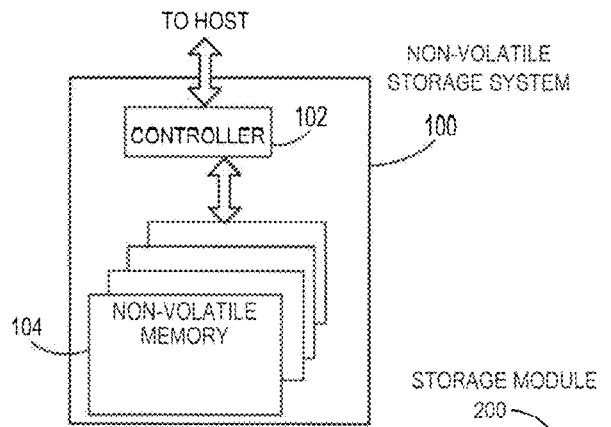
FIG. 1A is a block diagram of a non-volatile storage system of an embodiment.
Figure 1B:
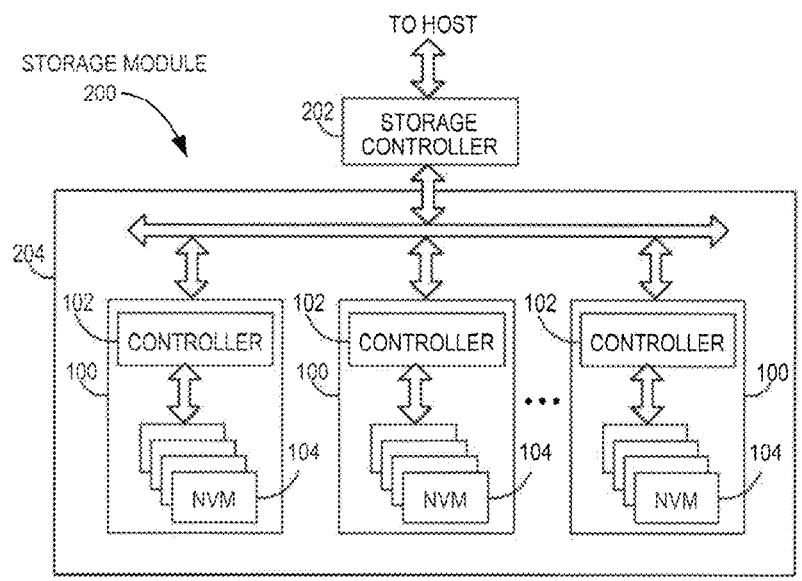
FIG. 1B is a block diagram illustrating a storage module of an embodiment.
Figure 1C:
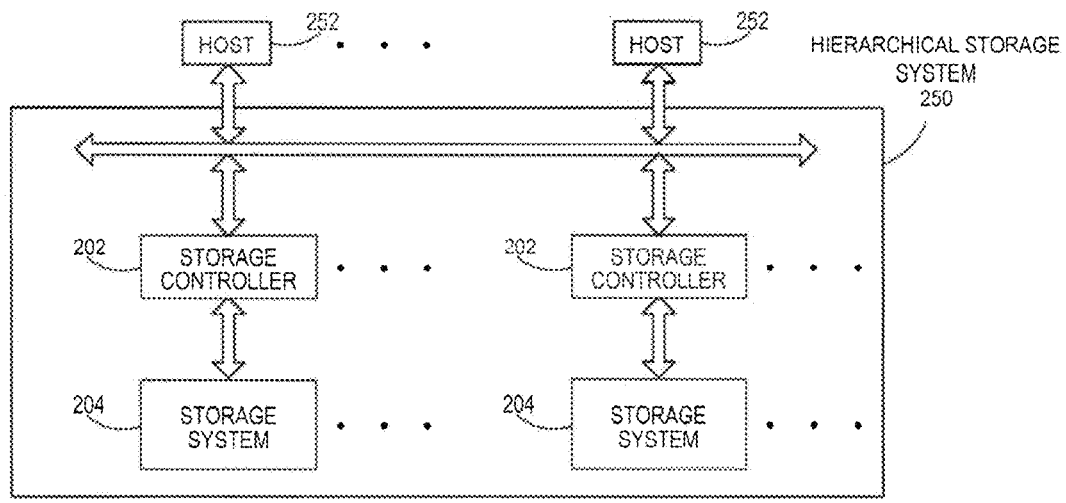
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
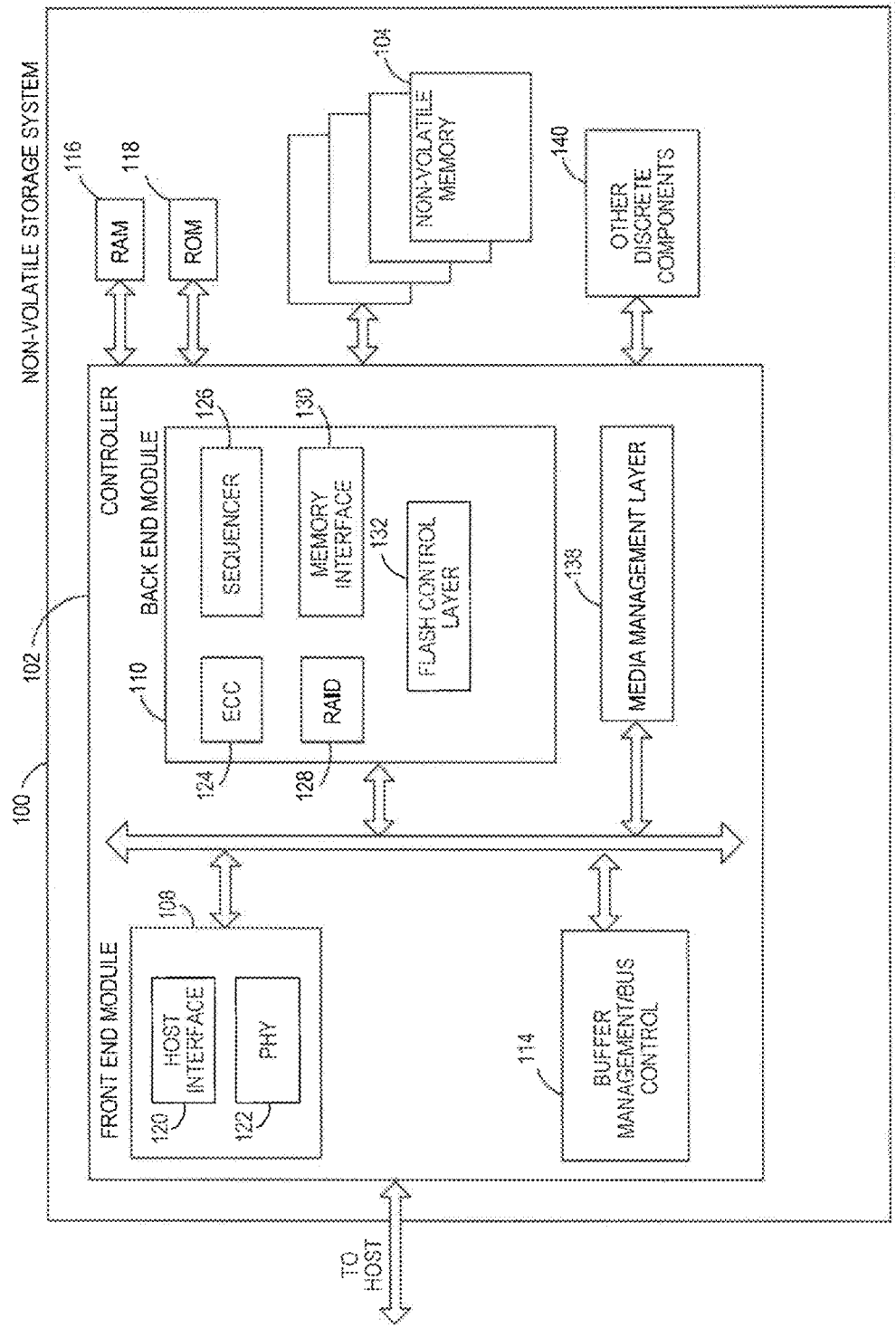
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
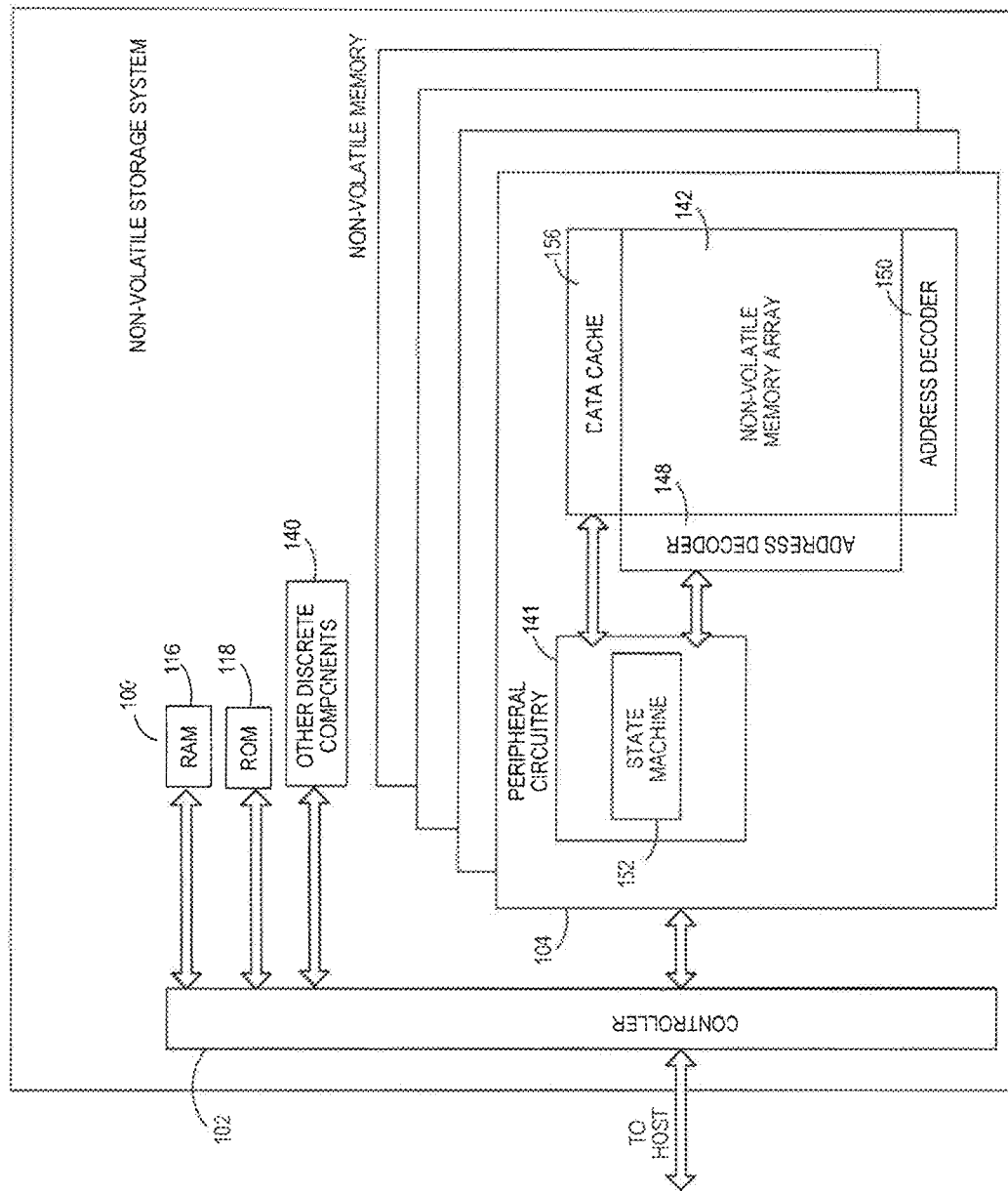
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
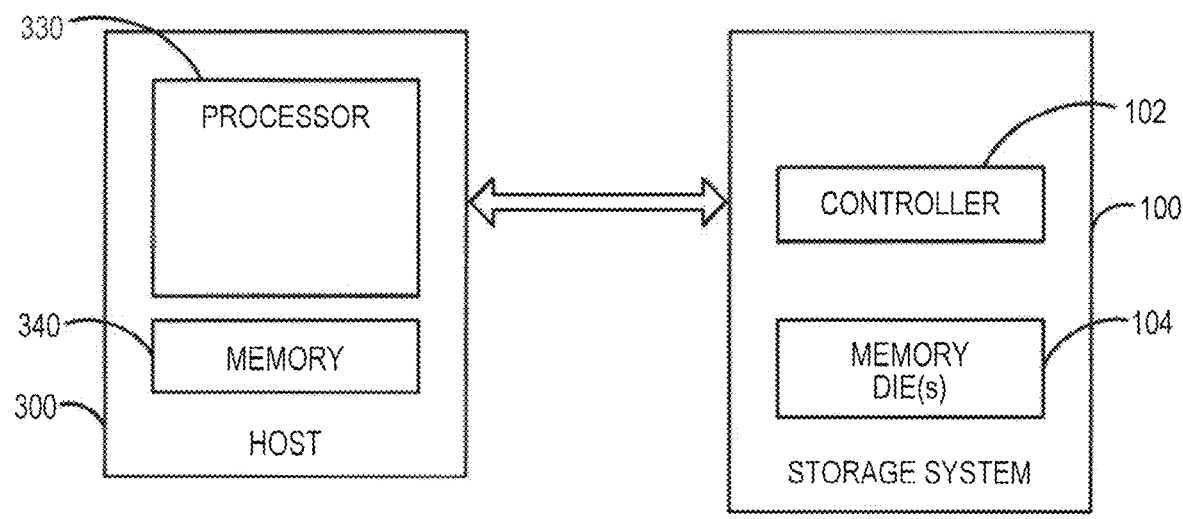
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

The storage system 100 can reserve some amount of space in the memory 104 for extra write operations, as well as for controller firmware, failed block replacements, and other unique features that vary by controller manufacturer. The minimum reserve is simply the difference between binary and decimal naming conventions. One gigabyte (GB) is precisely 1,000,000,000 bytes, and one gibibyte (GiB) is precisely $2^{30}=1,073,741,824$ bytes, or about 7.37% more than one GB. This extra space can be used for overprovisioning (i.e., providing extra blocks of memory than may be advertised to the end user). The more the storage system 100 overprovisions, the better its performance. However, due to cost, the storage system 100 is often limited in the amount of size for overprovisioning.

Figure 4:
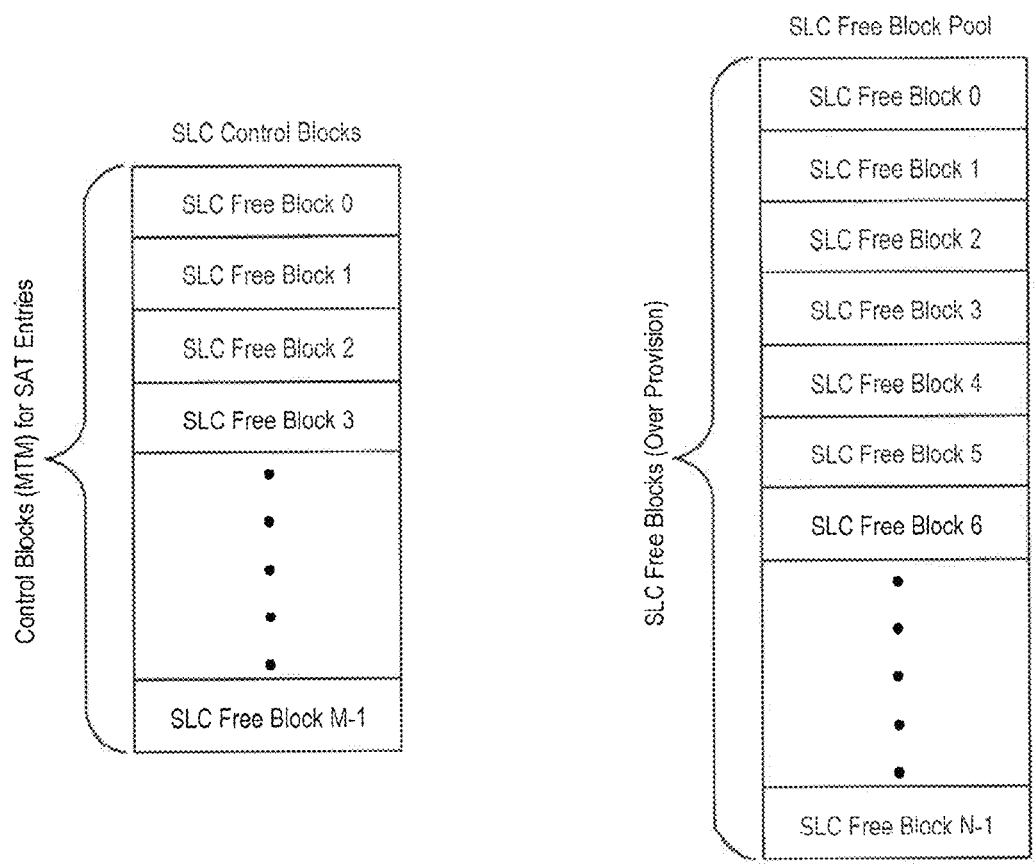
FIG. 4 is a diagram illustrating the allocation of control and over-provision blocks of an embodiment.

Returning to the drawings, FIG. 4 is a diagram illustrating the allocation of control blocks and overprovision blocks in the memory 104 of an embodiment. In this example, all the blocks are single-level cell (SLC) blocks, although, in different implementations, some or all of the blocks can be multi-level cell (MLC) blocks. In one embodiment, a control block is used to store one or more entries of a storage address table (SAT) that provides a conversion from a logical address to a physical address of the memory 104 (i.e., a logical-to-physical address table or map). A control block may sometimes be referred to herein as a memory translation map (mtm). A control block can contain other information. For example, a control block can store any combination of valid SAT pages, SAT index pages, obsolete pages, and other information.

As shown in FIG. 4, in this embodiment, there are M+N number of free blocks in the memory 104, where M number of free blocks are allocated for use as control blocks, and N number of free blocks are allocated as overprovision blocks for use as data storage blocks. In this embodiment, the number of blocks allocated for control blocks is fixed, as is the number of blocks allocated as overprovision blocks, irrespective of memory capacity. The flow chart 500 in FIG. 5 further illustrates this embodiment.

Figure 5:
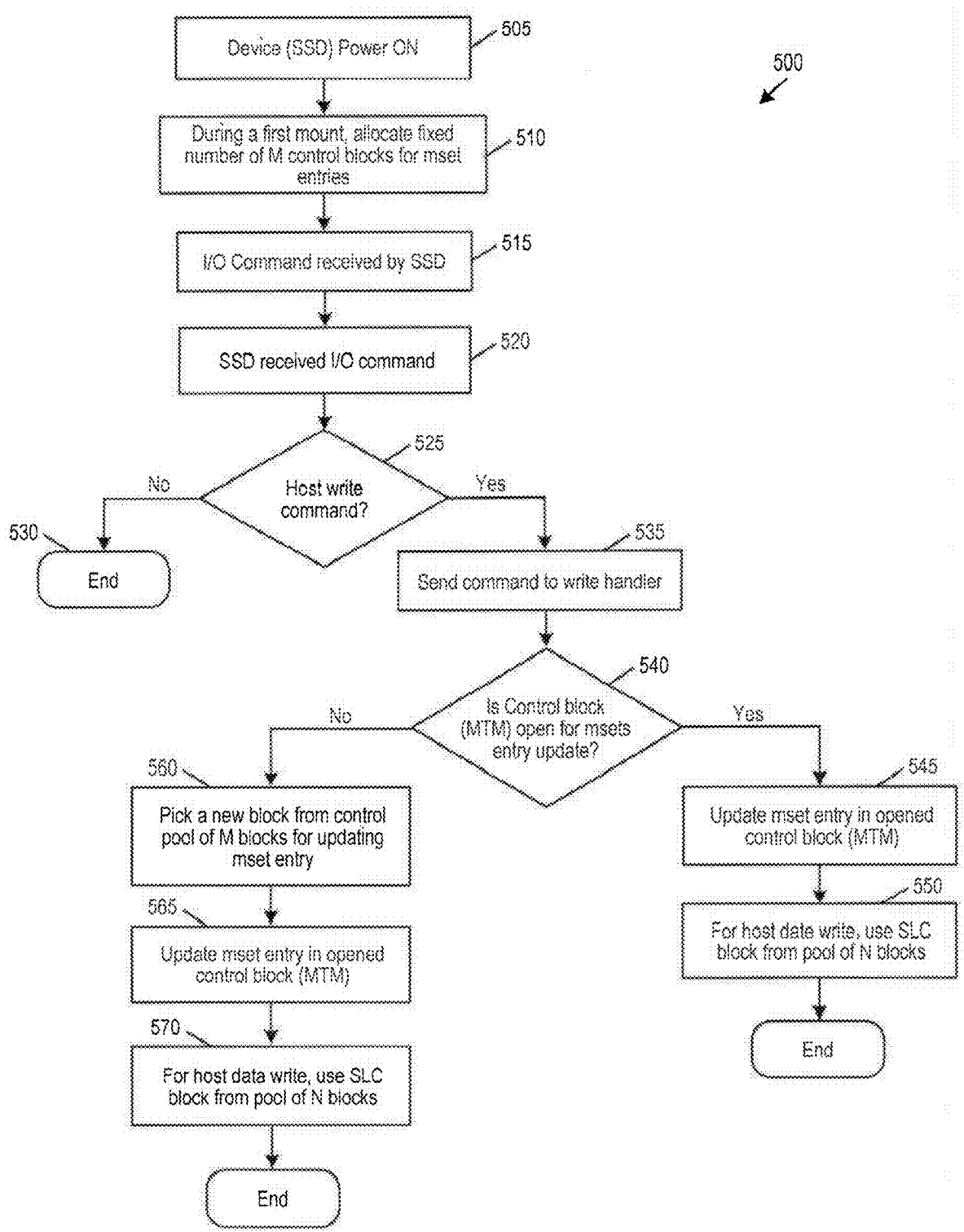
FIG. 5 is a flow chart of a method of an embodiment for writing handling.

As shown in FIG. 5, after the storage system 100 (e.g., an SSD) is powered on (act 505), the controller 102 allocates a fixed number (M) of control blocks during the first mount of the storage system 100 (act 510). As used herein, a first mount of the storage system 100 refers to the process of making data stored in the data storage device 100 accessible to the host 300 (e.g., via the host's file system). This can occur, for example, by the host 300 acquiring access to the data storage device 100 and obtaining any necessary file system structures. When the mounting process is done, a user on the host can access data stored in the data storage device 100. After the controller 102 receives an input/output (I/O) command from the host 300 (acts 515 and 520), the controller 102 determines if the command is a write command (act 525). If the command is not a write command, the method ends (act 530). However, if the command is a write command, the command is sent to a write handler (e.g., in the controller 102) (act 535).

Because the write command will be writing data into a physical location in the memory 104, an entry (sometimes referred to herein as an mset entry) in a control block will be needed to associate the logical address specified in the write command with the physical address of the memory location that the controller 102 writes the data in. So, the controller 102 first determines if a control block is open for such an entry update (act 540). If a control block is open, the controller 102 updates the entry in the open control block (act 545) and then uses a block from the pool of N number of overprovisioned blocks to store the data (act 550).

If a control block is not open for an entry update, the controller 102 opens a new block from the pool of M number of available control blocks (act 560) and updates the entry in the newly-opened control block (act 565). The controller 102 then uses a block from the pool of N number of overprovisioned blocks to store the data (act 570).

As shown by this method, in this embodiment, during the first mount, the storage system 100 allocates a fixed number of control blocks (M) and a fixed number of SLC overprovision blocks (N). For any host writes, logical-to-physical address mapping details from the flash translation layer (FTL) are updated as mset entry (e.g., using a logical block ID with a flash management unit (FMU) offset) for each host write request. All these entries of msets are written in control blocks continuously until the block becomes full. Once one control block or MTM block is full, the controller 102 will start writing to another new block from the control block pool.

Figure 6:
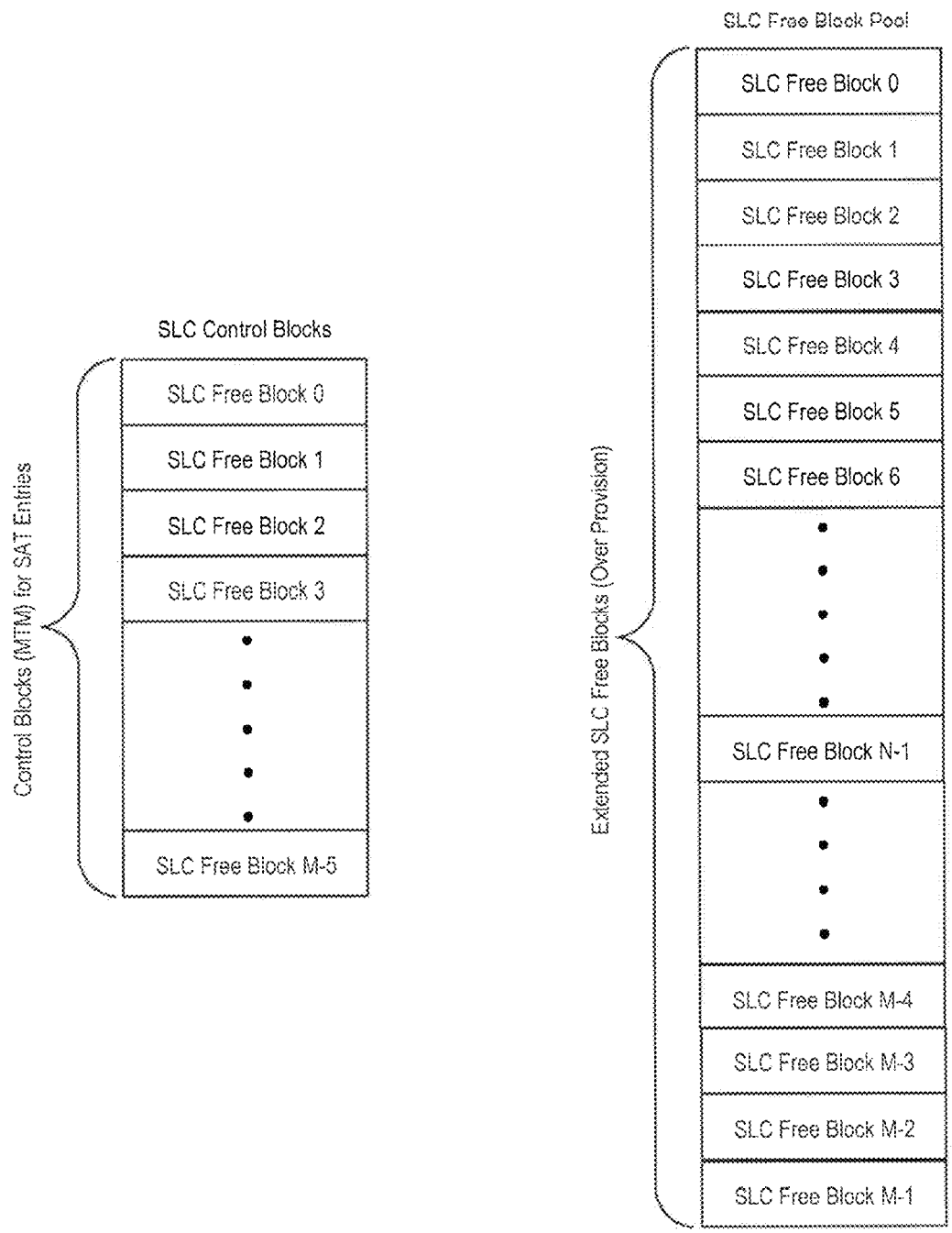
FIG. 6 is a diagram illustrating the allocation of control and over-provision blocks of an embodiment.

In another embodiment, instead of having a fixed number of allocated control and overprovisioned data blocks (e.g., M number of control blocks and N number of overprovision blocks), the controller 102 can dynamically alter the allocation (e.g., based on the logical fullness of the memory 104). For example, as shown in FIG. 6, the controller 102 may decide that four of the blocks that would otherwise be allocated for use as control blocks (Blocks M-4, M-3, M-2, and M-1) should be allocated as extra blocks in the overprovision data block pool (e.g., to increase SLC caching). This embodiment will now be described in more detail in conjunction with the flow chart 700 in FIG. 7.

Figure 7:
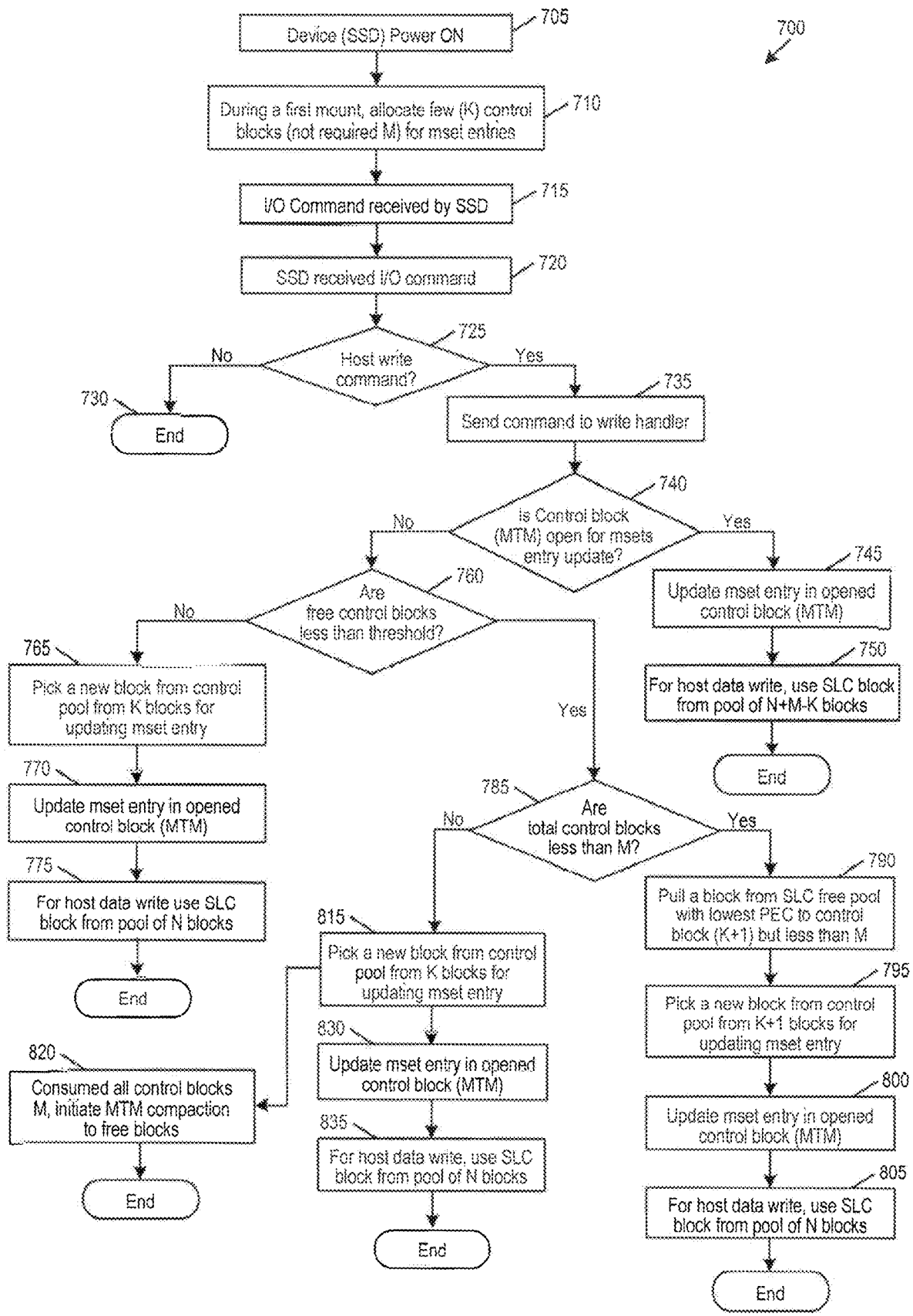
FIG. 7 is a flow chart of a method of an embodiment for writing handling.

As shown in FIG. 7, after the storage system 100 (e.g., an SSD) is powered on (act 705) and first mounted, the controller 102 can decide to allocate a smaller number (K) of control blocks than the number (M) typically allocated under a fixed allocation system (act 710). After the controller 102 receives an input/output (I/O) command from the host 300 (act 715, 720), the controller 102 determines if the command is a write command (act 725). If it is not, the method ends (act 730). However, if it is, the command is sent to a write handler (e.g., in the controller 102) (act 735).

The controller 102 then determines if a control block is open for a logical-to-physical address table entry update (act 740). If a control block is open, the controller 102 updates the entry in the open control block (act 745) and writes the data from the write command in an SLC block from the overprovision pool of blocks (act 750). This overprovision pool contains not only the N number of blocks that would normally be allocated but also the extra M–K number of blocks that the controller 102 allocated from the control block pool to the overprovision pool. This helps ensure there is an available overprovision block for the write data.

If a control block is not open, the controller 102 determines if the number of free control blocks is less than a threshold (act 760). If the number of free control blocks is not less than the threshold, the controller 102 picks and opens a new block from the pool of K number of control blocks (act 765), updates the entry in the newly-opened control block (act 770), and writes the write data in one of the overprovision blocks (act 775).

If the number of free control blocks is less than the threshold, the controller 102 determines if the total number of control blocks is less than M (act 785). If the total number of control blocks is less than M, the controller 102 pulls a block from the SLC free pool with the lowest program-erase cycle count (PEC) (act 790). The controller 102 then picks a new block from the control pool for updating the mset entry (act 795). After that, the controller 102 updates the mset entry in the opened control block (act 800) and uses an SLC block from the overprovision pool for the write data (act 805).

If the total number of control blocks is not less than M, the controller 102 pulls a new block from the control pool (act 815). (If all the control blocks are consumed, the controller 102 initiates a compaction process to free blocks (act 820).) The controller 102 then updates the mset entry in the open control block (act 830) and writes the host data in one of the overprovisioned blocks (act 835).

With this embodiment, there are initially K number of blocks for the control block pool, where K is less than M but can be decided based on application and host loads. During any host write, for logical-to-physical address table updates, an open control block from the pool of K number of blocks is used if no control block is open. The controller 102 continues updating logical-to-physical address entries of all host write requests until the control block is full, at which time the controller 102 opens another block from the control block pool. Meanwhile, the controller 102 uses the remaining M-K number of control blocks to move to the SLC overprovision pool to improve SLC caching, which eventually improves host write and read performance. Whenever control blocks are running out, the controller 102 can pull a block from the SLC overprovision pool to the control block pool and use it for mapping table updates. The controller 102 can be configured to make sure not to run out of control blocks and or to free blocks in the overprovision pool, which can result in the storage system 100 getting hung. To do this, the controller 102 can make sure allocation of control blocks balances with logical fullness of the memory 104. If there is still a risk of control blocks running out, the controller 102 can initiate a control compaction process on control blocks (e.g., using existing garbage collection techniques) to free up blocks.

Figure 9:
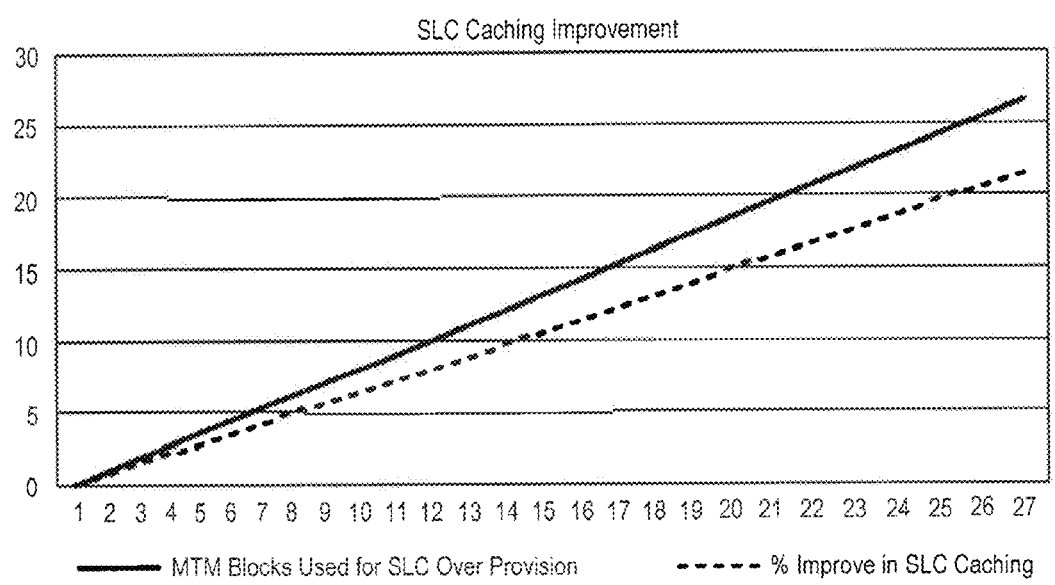
FIG. 9 is a graph showing performance analysis of an embodiment.

Returning to the drawings, FIG. 8 is a chart showing performance measurements of an embodiment. As shown in this chart, from the maximum allocation of control blocks (26), moving blocks to the SLC overprovision pool increases burst performance. For best results, up to 15 blocks can be moved to the SLC overprovision pool to improve close to 10% (up to 100% logical fullness) of device overprovision capacity (but this may not be the case for full random write loads). Typically, 5-10 control blocks can be moved to the overprovision pool for 100% logical fullness of the device. However, if the user uses 50% or 25% of device capacity, SLC overprovision pool size can be extended up to 20 or 21 blocks, which gives close to a 14% improvement in burst and sustained write performance of the storage system 100. FIG. 9 is a graph that is a pictorial representation of the table in FIG. 8 and gives a clear indication of how performance can be improved by moving a few control blocks to the SLC overprovision pool temporarily when they are not required.

There are several advantages associated with these embodiments. For example, these embodiments can have a great impact on write and read performance of the device during burst mode (e.g., more than 15%). Also, these embodiments can provide an improvement in sustained write and read of host commands (e.g., typically from 5 to 12%). Additionally, these embodiments can reduce write amplification and consume little to no overhead when existing garbage collection algorithms are used. Further, these embodiments may have no impact on power measurements.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
a memory comprising a first number of blocks configured to be reserved as control blocks and a second number of blocks configured to be reserved as overprovision blocks; and
a controller coupled to the memory and configured to:
allocate some of the first number of blocks as overprovision blocks instead of control blocks;
determine whether a number of control blocks that are free is less than a threshold; and
in response to determining that the number of control blocks that are free is less than the threshold, allocate an overprovision block as a control block.

2. The storage system of claim 1, wherein the controller is further configured to select the overprovision block to allocate based on a program-erase cycle count.

3. The storage system of claim 1, wherein the controller is further configured to determine whether a total number of consumed control blocks is less than the first number and is further configured to allocate the overprovision block in response to determining that the total number of consumed control blocks is less than the first number.

4. The storage system of claim 3, wherein the controller is further configured to perform a compaction operation on the control blocks to generate an open control block in response to determining that the total number of consumed control blocks is not equal to the first number.

5. The storage system of claim 1, wherein the controller is further configured to determine how many of the first number of blocks to allocate as overprovision blocks based on logical fullness of the memory or on a host load.

6. The storage system of claim 1, wherein the first number is a maximum allowed number of control blocks.

7. The storage system of claim 1, wherein the controller is further configured to allocate some of the first number of blocks as overprovision blocks during a first mount to a host.

8. The storage system of claim 1, wherein the controller is further configured to:
receive a write command from the host;
determine whether an open control block is available; and
in response to determining that an open control block is available:
update a logical-to-physical map entry in the open control block; and
write data from the write command in an overprovision block.

9. The storage system of claim 8, wherein the controller is further configured to determine whether the number of control blocks that are free is less than the threshold in response to determining that an open control block is not available.

10. The storage system of claim 1, wherein the controller is further configured to:
in response to determining that the number of blocks that are free is not less than the threshold:
select an open control block:
update a logical-to-physical map entry in the open control block; and
write data from a write command in an overprovision block.

11. The storage system of claim 1, wherein the memory comprises a three-dimensional memory.

12. In a storage system comprising a memory comprising a first number of blocks configured to be reserved as control blocks and a second number of blocks configured to be reserved as overprovision blocks, a method comprising:
allocating some of the first number of blocks as overprovision blocks instead of control blocks;
determining whether a number of control blocks that are free is less than a threshold; and
in response to determining that the number of control blocks that are free is less than the threshold, allocating an overprovision block as a control block.

13. The method of claim 12, further comprising selecting the overprovision block to allocate based on a program-erase cycle count.

14. The method of claim 12, further comprising:
determining whether a total number of consumed control blocks is less than the first number, wherein the overprovision block is allocated in response to determining that the total number of consumed control blocks is less than or equal to the first number.

15. The method of claim 12, further comprising determining how many of the first number of blocks to allocate as overprovision blocks based on logical fullness of the memory.

16. The method of claim 12, further comprising determining how many of the first number of blocks to allocate as overprovision blocks based on host load.

17. The method of claim 12, wherein some of the first number of blocks is allocated as overprovision blocks during a first mount to a host.

18. The method of claim 12, further comprising:
receiving a write command from the host;
determining whether an open control block is available; and
in response to determining that an open control block is available:
updating a logical-to-physical map entry in the open control block; and
writing data from the write command in an overprovision block.

19. The method of claim 18, wherein the first number is a maximum allowed number of control blocks.

20. A storage system comprising:
a memory comprising a first number of blocks configured to be reserved as control blocks and a second number of blocks configured to be reserved as overprovision blocks;
means for allocating some of the first number of blocks as overprovision blocks instead of control blocks;
means for determining whether a number of control blocks that are free is less than a threshold; and
means for allocating an overprovision block as a control block in response to determining that the number of control blocks that are free is less than the threshold.

* * * * *